（12) United States Patent
Kuwata

(10) Patent No.: US 7,434,026 B2
(45) Date of Patent: Oct. 7, 2008

(54) DISK ARRAY DEVICE AND VIRTUAL VOLUME MANAGEMENT METHOD USING A LOGICAL TABLE AND A PHYSICAL TABLE

(75) Inventor: Atsushi Kuwata, Tokyo (JP)

(73) Assignee: NEC Corporation, Tokyo (JP)

( * ) Notice: Subject to any disclaimer, the term of this patent is extended or adjusted under 35 U.S.C. 154(b) by 761 days.

(21) Appl. No.: 10/635,529

(22) Filed: Aug. 7, 2003

(65) Prior Publication Data
US 2004/0039875 A1    Feb. 26, 2004

(30) Foreign Application Priority Data
Aug. 13, 2002   (JP)   ............................. 2002-235603

(51) Int. Cl.
*G06F 12/08*    (2006.01)
(52) U.S. Cl. ...................... 711/207; 711/113
(58) Field of Classification Search ................ None
See application file for complete search history.

(56) References Cited

FOREIGN PATENT DOCUMENTS

| JP | 07-210332 | 8/1995 |
|---|---|---|
| JP | 2002-073409 | 3/2002 |

*Primary Examiner*—B. James Peikari
(74) *Attorney, Agent, or Firm*—McGinn IP Law Group, PLLC

(57) ABSTRACT

A logical table has a layered structure formed of a higher layer logical table arranged on a memory and a lower layer logical table arranged on a disk and stores where each part of a physical region corresponding to each part of a virtual volume is located, a physical table has a layered structure formed of a higher layer physical table arranged on the memory and a lower layer physical table arranged on the disk and stores a state of assignment of each part of a physical region, and a controller copies a part or all of the lower layer logical table and the lower layer physical table into the memory to conduct management of virtual volume.

17 Claims, 15 Drawing Sheets

FIG. 2

| HIGHER LAYER LOGICAL TABLE | VOLUME #0 | | | | VOLUME #1 |
|---|---|---|---|---|---|
| MANAGEMENT TABLE BLOCK #0 | EFFECTIVE FLAG | ASSIGNED PHYSICAL ADDRESS | MEMORY EFFECTIVE FLAG | ASSIGNED MEMORY ADDRESS | |
| MANAGEMENT TABLE BLOCK #1 | EFFECTIVE FLAG | ASSIGNED PHYSICAL ADDRESS | MEMORY EFFECTIVE FLAG | ASSIGNED MEMORY ADDRESS | |
| MANAGEMENT TABLE BLOCK #2 | EFFECTIVE FLAG | ASSIGNED PHYSICAL ADDRESS | MEMORY EFFECTIVE FLAG | ASSIGNED MEMORY ADDRESS | |
| MANAGEMENT TABLE BLOCK #3 | EFFECTIVE FLAG | ASSIGNED PHYSICAL ADDRESS | MEMORY EFFECTIVE FLAG | ASSIGNED MEMORY ADDRESS | |
| MANAGEMENT TABLE BLOCK #4 | EFFECTIVE FLAG | ASSIGNED PHYSICAL ADDRESS | MEMORY EFFECTIVE FLAG | ASSIGNED MEMORY ADDRESS | |
| ... | | | | | ... |

FIG. 4

| HIGHER LAYER PHYSICAL TABLE | DISK #0 | | DISK #1 |
|---|---|---|---|
| | FREE MANAGEMENT TABLE BLOCK COUNTER | | |
| | FREE MANAGEMENT TABLE BLOCK LEAD LINK POINTER | | |
| MANAGEMENT TABLE BLOCK #0 | LINK POINTER | MEMORY EFFECTIVE FLAG | ASSIGNED MEMORY ADDRESS |
| MANAGEMENT TABLE BLOCK #1 | LINK POINTER | MEMORY EFFECTIVE FLAG | ASSIGNED MEMORY ADDRESS |
| MANAGEMENT TABLE BLOCK #2 | LINK POINTER | MEMORY EFFECTIVE FLAG | ASSIGNED MEMORY ADDRESS |
| MANAGEMENT TABLE BLOCK #3 | LINK POINTER | MEMORY EFFECTIVE FLAG | ASSIGNED MEMORY ADDRESS |
| MANAGEMENT TABLE BLOCK #4 | LINK POINTER | MEMORY EFFECTIVE FLAG | ASSIGNED MEMORY ADDRESS |

FIG 5
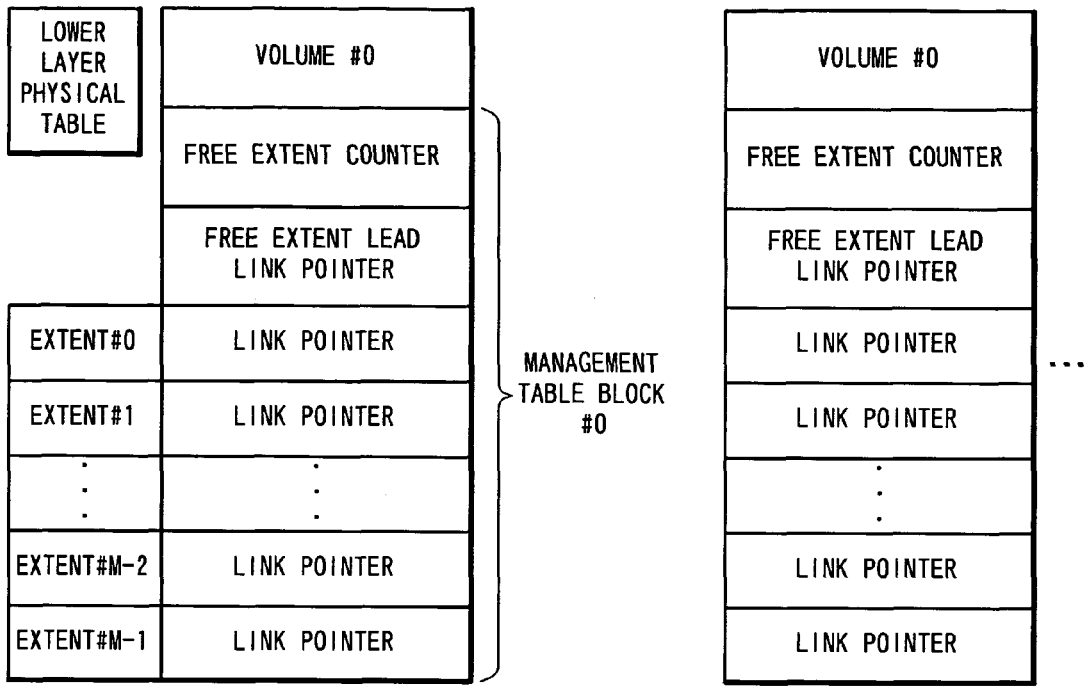
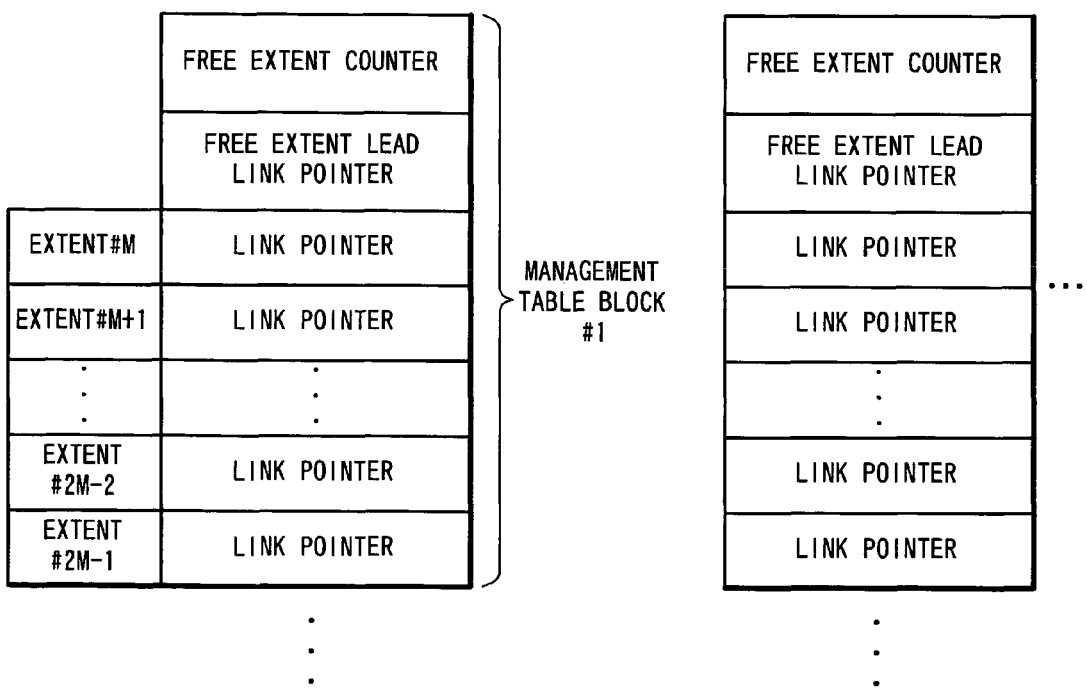

FIG. 14 (PRIOR ART)

| LOGICAL TABLE | VOLUME #0 | | VOLUME #1 | |
|---|---|---|---|---|
| EXTENT #0 | EFFECTIVE FLAG | ASSIGNED PHYSICAL ADDRESS | EFFECTIVE FLAG | ASSIGNED PHYSICAL ADDRESS |
| EXTENT #1 | EFFECTIVE FLAG | ASSIGNED PHYSICAL ADDRESS | EFFECTIVE FLAG | ASSIGNED PHYSICAL ADDRESS |
| EXTENT #2 | EFFECTIVE FLAG | ASSIGNED PHYSICAL ADDRESS | EFFECTIVE FLAG | ASSIGNED PHYSICAL ADDRESS |
| EXTENT #3 | EFFECTIVE FLAG | ASSIGNED PHYSICAL ADDRESS | EFFECTIVE FLAG | ASSIGNED PHYSICAL ADDRESS |
| EXTENT #4 | EFFECTIVE FLAG | ASSIGNED PHYSICAL ADDRESS | EFFECTIVE FLAG | ASSIGNED PHYSICAL ADDRESS |

FIG. 15 (PRIOR ART)

| PHYSICAL TABLE | DISK #0 | DISK #1 |
|---|---|---|
| | FREE EXTENT COUNTER | FREE EXTENT COUNTER |
| | FREE EXTENT LEAD LINK POINTER | FREE EXTENT LEAD LINK POINTER |
| EXTENT #0 | LINK POINTER | LINK POINTER |
| EXTENT #1 | LINK POINTER | LINK POINTER |
| EXTENT #2 | LINK POINTER | LINK POINTER |
| EXTENT #3 | LINK POINTER | LINK POINTER |
| EXTENT #4 | LINK POINTER | LINK POINTER |

DISK ARRAY DEVICE AND VIRTUAL VOLUME MANAGEMENT METHOD USING A LOGICAL TABLE AND A PHYSICAL TABLE

BACKGROUND OF THE INVENTION

1. Field of the Invention

The present invention relates to a virtual volume management system for realizing a virtual volume technique known as one of useful techniques in a disk array device (virtual volume management system in a disk array device).

2. Description of the Related Art

In a disk array device, host access (access from a host computer) is controlled by logical data storage space called a volume. Since inside the disk array device, data written in a volume is actually held somewhere in the disk, a relationship between an address of a region in the volume and an address of a region in the disk is stored as management information in the disk array device.

A virtual volume technique is a "technique of not assigning all the volume regions to physical regions of a disk having been mounted at the time when the volume is set up, but, rather, assigning the volume regions to the physical regions of the disk in the processing to follow, as required, without assigning them to the physical regions at the time when the volume is set up".

A first advantage of the virtual volume technique is that of enabling a volume larger than a physical capacity to be set up. There is a case where, although logical space of a large volume is preferably defined for an application, the entire volume is not necessarily required at the same time and only a small volume is actually needed. In such an application, when defining logical space of a large volume, having no need of a physical volume meeting the space will lead to a cost reduction.

A second advantage of the virtual volume technique is that of enabling assignment to a physical region to be easily dynamically changed later. Facilitating dynamic change of physical region assignment when distributing disk loads according to the needs of the host access, by expanding a disk later on or the like will help solve the performance problem.

In the following, description will be made of a currently well-known system among the virtual volume management systems for realizing the above-described virtual volume technique, with reference to FIGS. 12 to 15.

FIG. 12 is a block diagram showing a physical image of a disk array device. On a disk array device 22 connected to a host 21, disks 223 to 226 are mounted. As shown in the figure, in the disks 223 to 226, physical space is managed as being sectioned into areas called fixed physical extents.

FIG. 13 is a block diagram showing a logical image of the disk array device. Seen from the host 21, volumes 227 and 228 seem to exist in the disk array device 22. As internal management of the disk array device 22, the volumes 227 and 228 are managed as being sectioned into areas called logical extents, as illustrated in the figure.

Here, with a logical extent and a physical extent having the same size to a one-to-one correspondence with each other, the correspondence therebetween is made when required in the virtual volume technique, and when not required, there will exist an extent whose correspondence is yet to be made. As a means for managing the correspondence, a memory unit 222 will be provided with a management table indicative of the relevant correspondence. The management table includes, for example, such a logical table such as shown in FIG. 14 and a physical table such as shown in FIG. 15.

The logical table in FIG. 14 manages, for each logical extent (logical extent identified by an extent number (extent #0 to extent #4 in the figure)), an effective flag indicating whether the logical extent is assigned to a physical extent or not and an assigned physical address indicative of a physical address to which assignment is made.

On the other hand, the physical table in FIG. 15 manages a link pointer for each physical extent (physical extent identified by an extent number (the extent #0 to the extent #4 in the figure). For managing whether each physical extent has been already assigned or yet to be assigned, the physical table manages an extent yet to be assigned (free extent) by using a link with respect to all the physical extents (management using a free extent counter, a free extent lead link pointer and a link pointer).

While the conventional virtual volume management system as described above enables a virtual volume technique in a disk array device to be realized, the conventional technique is conditioned on that for storing such a management table as described above (e.g. the logical table shown in FIG. 14 and the physical table shown in FIG. 15), a memory of a sufficient capacity is mounted.

Here, the size of the management table is increased proportional with the size of a logical volume and the size of a physical capacity, as described above. The larger a logical volume to be set up is or the larger a physical capacity to be mounted is, the more required a memory capacity will result in increasing costs.

Conversely, for fixing a memory capacity in order to avoid an increase in costs, it is necessary to limit a logical capacity or a physical capacity which can be used as a virtual volume. Limiting a capacity of a virtual volume will prevent such advantages from being satisfactorily attained, such as "defining a volume of a large capacity with low costs" and "realizing disk expansion without causing performance problem", which are original features of virtual volume techniques.

As described in the foregoing, what is needed for making good use of the virtual volume techniques is "controlling logical space and physical space of a large volume without constraints on costs". Conventional virtual volume management systems, however, have a problem of failing to appropriately meet such a demand.

SUMMARY OF THE INVENTION

An object of the present invention is to provide a disk array device and a virtual volume management method in a disk array device which enable a virtual volume of a large capacity to be defined with a memory of a small capacity, while minimizing overhead for disk access in management information processing of the virtual volume as much as possible by handling the management information in a best manner (by arranging entire management data of a management table in a disk drive and partially rearranging a necessary part in a fixed region on a memory every time the necessity arises) at the time of realizing a virtual volume technique in a disk array device, in view of the above-described problems.

In other words, the present invention is characterized in hierarchically managing a management table required for virtual volume management (logical table and physical table) to conduct cache control of "reading information into a memory as required with information of a management table in a higher layer (higher hierarchy) constantly held in the memory and entity of information of a management table in a lower layer (lower hierarchy) placed on a disk. This arrangement will make data in a frequently accessed management table exist on the memory more often, so that in the processing of management information related to a virtual volume, only memory access is required in many cases to reduce a case where disk access should be conducted as well, resulting in, on average, having processing time approximate to that which occurs when all the management information exists on the memory. As a result, a virtual volume of a larger capacity can be realized with a memory of a limited capacity.

According to the first aspect of the invention, a disk array device, to be accessed by a host, comprises a logical table having a layered structure formed of a higher layer logical table arranged on a memory and a lower layer logical table arranged on a disk for storing a correspondence relationship between each part of a virtual volume and each part of a physical region, a physical table having a layered structure formed of a higher layer physical table arranged on the memory and a lower layer physical table arranged on the disk for storing a state of assignment of each part of a physical region, and a controller for reading a part or all of the lower layer logical table and the lower layer physical table into the memory as required to conduct management of the virtual volume.

According to the second aspect of the invention, a disk array device, to be accessed by a host, comprises a cache control region on a memory which is formed of a plurality of management table buffers and a memory management table for conducting management of the buffers, a logical table having a layered structure formed of a higher layer logical table arranged on the memory and a lower layer logical table arranged on a disk for storing information indicating where a physical extent on the disk to which each logical extent in a virtual volume is assigned exists, a physical table having a layered structure formed of a higher layer physical table arranged on the memory and a lower layer physical table arranged on the disk for storing information indicative of a state of assignment of each physical extent, and a controller for, when access to the lower layer logical table and the lower layer physical table is required, obtaining the management table buffer to copy data in the lower layer logical table and the lower layer physical table to be accessed into the management table buffer in question and store the data in the management table buffer after accessing, thereby conducting cache control between the cache control region and the lower layer logical table and the lower layer physical table on the disk.

In the preferred construction, the cache control region is formed of a management table buffer region having a plurality of management table buffers and a memory management table for managing the management table buffer region, the higher layer logical table of the logical table manages position, on the cache control region and on the disk, of each management table block in the lower layer logical table, the higher layer physical table of the physical table manages position, on the cache control region and on the disk, of each management table block in the lower layer physical table, and the controller copies data of the management table block in the lower layer logical table and the lower layer physical table to be accessed into the management table buffer in question to conduct cache control between the cache control region and a region on the disk in which the management table block is stored.

In another preferred construction, in a case where access to the lower layer logical table and the lower layer physical table is required, when no free management table buffer for copying data of a necessary part exists, the controller conducts processing of purging a management table buffer whose access time is the earliest.

In another preferred construction, the cache control region is formed of a management table buffer region having a plurality of management table buffers and a memory management table for managing the management table buffer region, the higher layer logical table of the logical table manages position, on the cache control region and on the disk, of each management table block in the lower layer logical table, the higher layer physical table of the physical table manages position, on the cache control region and on the disk, of each management table block in the lower layer physical table, and the controller copies data of the management table block in the lower layer logical table and the lower layer physical table to be accessed into the management table buffer in question to conduct cache control between the cache control region and a region on the disk in which the management table block is stored, and in a case where access to the lower layer logical table and the lower layer physical table is required, when no free management table buffer for copying data of a necessary part exists, conducts processing of purging a management table buffer whose access time is the earliest.

In another preferred construction, the higher layer logical table manages an effective flag, an assigned physical address, a memory effective flag and an assigned memory address for each management table block in each volume, the lower layer logical table manages an effective flag and an assigned physical address for each logical extent in each volume, the higher layer physical table manages a link pointer, a memory effective flag and an assigned memory address for each management table block in each disk and has a free management table block counter and a free management table block lead link pointer for the management of a free management table block link, the lower layer physical table manages a link pointer for each physical extent in each disk and has a free extent counter and a free extent lead link pointer for the management of a free extent link, and the memory management table of the cache control region manages a forward link pointer, a backward link pointer, a table kind and management block information for each management table buffer, and for the management of a free management table buffer link, has a free management table buffer counter, a free management table buffer lead link pointer and a free management table buffer last link pointer and for the management of an in-use management table buffer link, has an in-use management table buffer counter, an in-use management table buffer lead link pointer and an in-use management table buffer last link pointer.

In another preferred construction, the disk array device comprises a controller including a virtual volume setting up element for setting up a virtual volume by setting up a higher layer logical table having information indicating that a lower layer logical table is yet to be set up, a virtual volume read/write element for conducting virtual volume writing processing according to an access related to a write request from the host and conducting virtual volume reading processing according to an access related to a read request from the host, a free physical extent acquisition element for conducting free physical extent acquisition processing according to a request from the virtual volume read/write element, and a free management table buffer acquisition element for conducting free management table buffer acquisition processing according to a request from the virtual volume read/write element and the free physical extent acquisition element, thereby realizing cache control for the management of a virtual volume by each the element.

According to another aspect of the invention, a virtual volume management method in a disk array device to be accessed by a host, comprising the step of with a logical table having a layered structure formed of a higher layer logical table arranged on a memory and a lower layer logical table arranged on a disk for storing a correspondence relationship between each part of a virtual volume and each part of a physical region provided, and with a physical table having a layered structure formed of a higher layer physical table arranged on the memory and a lower layer physical table arranged on the disk for storing a state of assignment of each part of a physical region provided, conducting management of the virtual volume by reading a part or all of the lower layer logical table and the lower layer physical table into the memory as required.

According to another aspect of the invention, a virtual volume management method in a disk array device to be accessed by a host, comprising the step of with a cache control region on a memory which is formed of a plurality of management table buffers and a memory management table for conducting management of the buffers provided, with a logical table having a layered structure formed of a higher layer logical table arranged on the memory and a lower layer logical table arranged on a disk for storing information indicating where a physical extent on the disk to which each logical extent in a virtual volume is assigned exists provided, and with a physical table having a layered structure formed of a higher layer physical table arranged on the memory and a lower layer physical table arranged on the disk for storing information indicative of a state of assignment of each physical extent provided, when access to the lower layer logical table and the lower layer physical table is required, obtaining the management table buffer to copy data in the lower layer logical table and the lower layer physical table to be accessed into the management table buffer in question and store the data in the management table buffer after accessing, thereby conducting cache control between the cache control region and the lower layer logical table and the lower layer physical table on the disk.

In the preferred construction, the cache control region is formed of a management table buffer region having a plurality of management table buffers and a memory management table for managing the management table buffer region, the higher layer logical table of the logical table manages position, on the cache control region and on the disk, of each management table block in the lower layer logical table, the higher layer physical table of the physical table manages position, on the cache control region and on the disk, of each management table block in the lower layer physical table, and data of the management table block in the lower layer logical table and the lower layer physical table to be accessed is copied into the management table buffer in question to conduct cache control between the cache control region and a region on the disk in which the management table block is stored.

In another preferred construction, in a case where access to the lower layer logical table and the lower layer physical table is required, when no free management table buffer for copying data of a necessary part exists, processing of purging a management table buffer whose access time is the earliest is conducted.

In another preferred construction, the cache control region is formed of a management table buffer region having a plurality of management table buffers and a memory management table for managing the management table buffer region, the higher layer logical table of the logical table manages position, on the cache control region and on the disk, of each management table block in the lower layer logical table, the higher layer physical table of the physical table manages position, on the cache control region and on the disk, of each management table block in the lower layer physical table, data of the management table block in the lower layer logical table and the lower layer physical table to be accessed is copied into the management table buffer in question to conduct cache control between the cache control region and a region on the disk in which the management table block is stored, and in a case where access to the lower layer logical table and the lower layer physical table is required, when no free management table buffer for copying data of a necessary part exists, processing of purging a management table buffer whose access time is the earliest is conducted.

In another preferred construction, the higher layer logical table manages an effective flag, an assigned physical address, a memory effective flag and an assigned memory address for each management table block in each volume, the lower layer logical table manages an effective flag and an assigned physical address for each logical extent in each volume, the higher layer physical table manages a link pointer, a memory effective flag and an assigned memory address for each management table block in each disk and has a free management table block counter and a free management table block lead link pointer for the management of a free management table block link, the lower layer physical table manages a link pointer for each physical extent in each disk and has a free extent counter and a free extent lead link pointer for the management of a free extent link, and the memory management table of the cache control region manages a forward link pointer, a backward link pointer, a table kind and management block information for each management table buffer, and for the management of a free management table buffer link, has a free management table buffer counter, a free management table buffer lead link pointer and a free management table buffer last link pointer and for the management of an in-use management table buffer link, has an in-use management table buffer counter, an in-use management table buffer lead link pointer and an in-use management table buffer last link pointer.

In another preferred construction, the virtual volume management method in a disk array device comprises a virtual volume setting up step of setting up a virtual volume by setting up a higher layer logical table having information indicating that a lower layer logical table is yet to be set up, a virtual volume read/write step of conducting virtual volume writing processing according to an access related to a write request from the host and conducting virtual volume reading processing according to an access related to a read request from the host, a free physical extent acquisition step of conducting free physical extent acquisition processing according to a request from the virtual volume read/write step, and a free management table buffer acquisition step of conducting free management table buffer acquisition processing according to a request from the virtual volume read/write step and the free physical extent acquisition step, thereby realizing cache control for the management of a virtual volume by each the step.

According to another aspect of the invention, a program for conducting virtual volume management in a disk array device, comprising the function of with a cache control region on a memory which is formed of a management table buffer region having a plurality of management table buffers and a memory management table for conducting management of the management table buffer region provided, with a logical table which has a layered structure formed of a higher layer logical table arranged on the memory and a lower layer logical table arranged on a disk, the higher layer logical table managing position, on the cache control region and on the disk, of each management table block in the lower layer logical table, and stores information indicating where a physical extent on the disk to which each logical extent in a virtual volume is assigned exists provided, and with a physical table which has a layered structure formed of a higher layer physical table arranged on the memory and a lower layer physical table arranged on the disk, the higher layer physical table managing position, on the cache control region and on the disk, of each management table block in the lower layer physical table, and stores information indicative of a state of assignment of each physical extent provided, when access to the lower layer logical table/the lower layer physical table is required, obtaining the management table buffer to copy data of a management table block in the lower layer logical table/the lower layer physical table to be accessed into the management table buffer in question and store the data in the management table buffer after accessing, thereby conducting cache control between the cache control region and a region on the disk in which the management table block is stored.

In the preferred construction, the program for conducting virtual volume management in a disk array device comprises the function of, in a case where access to the lower layer logical table/lower layer physical table is required, when no free management table buffer for copying data of a necessary part exists, realizing copying of the data by processing of purging a management table buffer whose access time is the earliest.

In another preferred construction, the memory stores the higher layer logical table for managing an effective flag, an assigned physical address, a memory effective flag and an assigned memory address for each management table block in each volume, the higher layer physical table for managing a link pointer, a memory effective flag and an assigned memory address for each management table block in each disk and having a free management table block counter and a free management table block lead link pointer for the management of a free management table block link, and the memory management table for managing a forward link pointer, a backward link pointer, a table kind and management block information for each management table buffer, and for the management of a free management table buffer link, having a free management table buffer counter, a free management table buffer lead link pointer and a free management table buffer last link pointer and for the management of an in-use management table buffer link, having an in-use management table buffer counter, an in-use management table buffer lead link pointer and an in-use management table buffer last link pointer, and the disk stores the lower layer logical table for managing an effective flag and an assigned physical address for each logical extent in each volume and the lower layer physical table for managing a link pointer for each physical extent in each disk and having a free extent counter and a free extent lead link pointer for the management of a free extent link, and which comprises the functions of:

setting up a virtual volume by setting up a higher layer logical table having information indicating that a lower layer logical table is yet to be set up, conducting virtual volume writing processing according to an access related to a write request from the host and conducting virtual volume reading processing according to an access related to a read request from the host, conducting free physical extent acquisition processing according to a request from the virtual volume read/write function, and executing free management table buffer acquisition processing according to a request from the virtual volume read/write function and the free physical extent acquisition function, thereby realizing cache control for the management of a virtual volume by these functions.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is a diagram showing a detailed structure of a higher layer logical table in FIG. 1;

FIG. 4 is a diagram showing a detailed structure of a higher layer physical table in FIG. 1;

FIG. 5 is a diagram showing a detailed structure of a lower layer physical table in FIG. 1;

FIG. 14 is a diagram showing a structure of a logical table in the conventional virtual volume management system; and FIG. 15 is a diagram showing a structure of a physical table in the conventional virtual volume management system.

DESCRIPTION OF THE PREFERRED EMBODIMENT

The preferred embodiment of the present invention will be discussed hereinafter in detail, with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail, in order to reduce unnecessarily obscuring the present invention.

Next, the present invention will be described in detail with reference to the drawings.

(1) First Mode of Implementation

Figure 1:
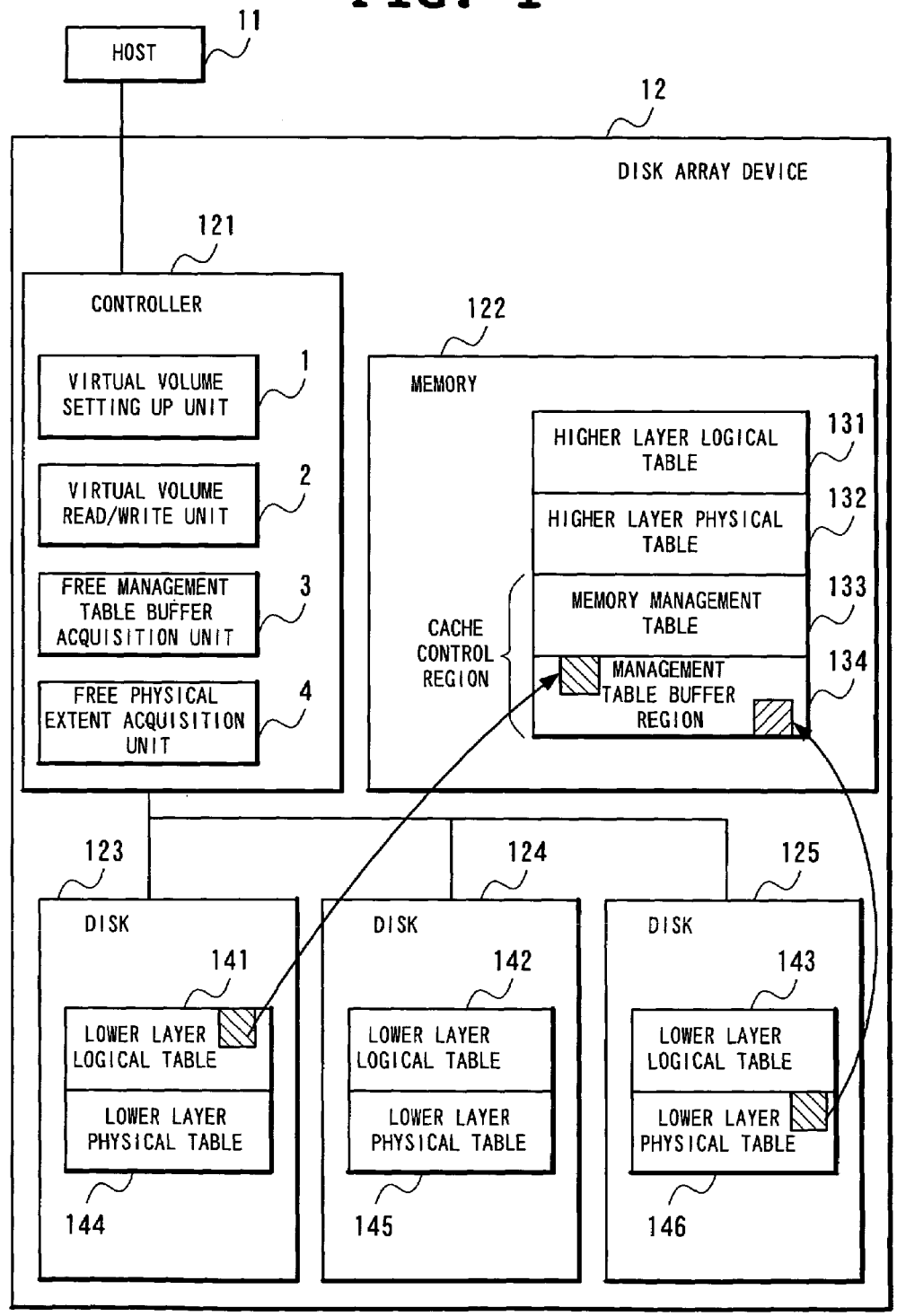
FIG. 1 is a block diagram showing a structure of a computer system to which a virtual volume management system according to a first mode of implementation of the present invention is applied.

FIG. 1 is a block diagram showing a structure of a computer system to which a virtual volume management system according to the first mode of implementation of the present invention is applied.

With reference to FIG. 1, the computer system includes a host (host computer) 11 and a disk array device 12.

The disk array device 12 includes a controller 121, a memory 122 and disks (physical disks) 123 to 125 (it goes without saying that the number of disks is not limited to three).

The controller 121 includes a virtual volume setting up unit 1, a virtual volume read/write unit 2, a free management table buffer acquisition unit 3 and a free physical extent acquisition unit 4.

There exist in the memory 122 a higher layer logical table 131, a higher layer physical table 132, a memory management table 133 and a management table buffer region 134.

There exist in the disk 123 a lower layer logical table 141 and a lower layer physical table 144. In the disk 124, a lower layer logical table 142 and a lower layer physical table 145 exist. In the disk 125, a lower layer logical table 143 and a lower layer physical table 146 exist.

As described in the foregoing, because the higher layer logical table 131 and the higher layer physical table 132 exist on the memory 122, high-speed access from the controller 121 is possible.

On the other hand, the lower layer logical tables 141 to 143 and the lower layer physical tables 144 to 146 exist on the disks 123 to 125, respectively, and their contents are partially copied into the management table buffer region 134. The state of the management table buffer region 134 is managed in the memory management table 133. More specifically, cache control (cache control whose contents are "reading of necessary data" and "writing of updated data") of the lower layer tables (the lower layer logical tables 141 to 143 and the lower layer physical tables 144 to 146) is conducted by the memory management table 133 and the management table buffer region 134 (a cache control region is formed by the memory management table 133 and the management table buffer region 134).

FIGS. 2 to 6 are diagrams for use in explaining virtual volume management tables (higher-layer/lower-layer logical table/physical tables) characterizing the virtual volume management system of the present invention.

In the present mode of implementation and the present invention accordingly, the logical table is formed with a two-stage layered structure.

The lower layer logical tables 141 to 143 are the same as the logical table according to the conventional art and with respect to each logical extent, hold information for managing a physical extent to which assignment is made. The lower layer logical tables 141 to 143 are preserved in the physical extents on the disks 123 to 125 and only a part of them (on a management table block basis) is read onto the memory 122 as required. Here, the lower layer logical tables 141 to 143 are divided to have a fixed size (the division unit is equivalent to a management table block).

The higher layer logical table 131 manages, on a management table block basis, at which position on the disks 123 to 125 the management table block in question is preserved or at which position on the memory 122 the same is preserved.

In addition, in the present mode of implementation and the present invention accordingly, the physical table is also formed with a two-stage layered structure (the lower layer physical tables 144 to 146 and the higher layer physical table 132 exist) to conduct the same management as that by the above-described logical tables.

On the memory 122, there exist a region for temporarily storing a management table block of the lower layer table (the management table buffer region 134) and a region for managing the block (the memory management table 133). A management table block is read from the disks 123 to 125 as required and stored in the memory 122. Since the size of the above-described region (region for temporarily storing a lower layer table) is fixed, when no free region exists, although purging processing (processing of purging old data on the memory by new data as a part of cache control) is conducted, because a management table block frequently used exists on the memory 122, disk access is required in less cases.

FIG. 2 is a diagram showing a detailed structure of the higher layer logical table 131.

The higher layer logical table 131 exists on the memory 122 and manages an effective flag, an assigned physical address, a memory effective flag and an assigned memory address with respect to each management table block (management table block on a logical table identified by a volume number (volumes #0, #1, . . . in the figure) and a management table block number (management table blocks #0, #1, . . . in the figure)) in each volume (virtual volume).

An effective flag for a certain management table block indicates whether the management table block exists on the disks 123 to 125 (when existing, the flag is on) (including information indicating that no assignment is made).

An assigned physical address for a certain management table block indicates, when the management table block exists on the disks 123 to 125 (when the effective flag is on), an address of the management table block on the disks 123 to 125.

A memory effective flag for a certain management table block indicates whether the management table block exists on the memory 122 (when existing, the flag is on) (including information indicating that no assignment is made).

An assigned memory address for a certain management table block indicates, when the management table block exists on the memory 122 (when the memory effective flag is on), an address of the management table block on the memory 122.

Figure 3:
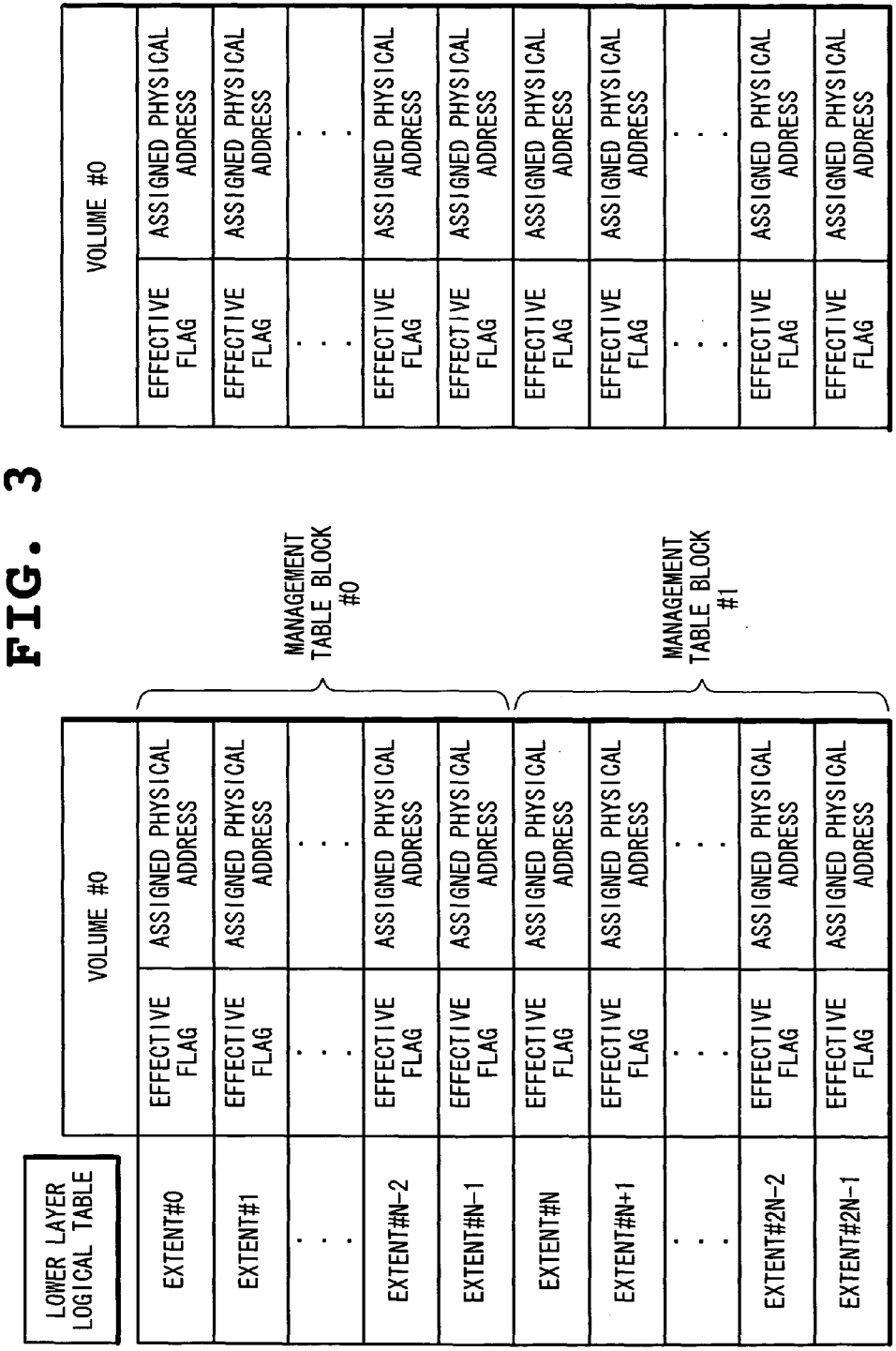
FIG. 3 is a diagram showing a detailed structure of a lower layer logical table in FIG. 1.

FIG. 3 is a diagram showing a detailed structure of the lower layer logical tables 141 to 143.

The lower layer logical tables 141 to 143 manage an effective flag and an assigned physical address with respect to each logical extent (logical extent identified by a volume number (the volumes #0, #1, . . . in the figure) and an extent number (extents #0, #1, . . . in the figure)) in each volume (virtual volume).

The tables do not exist as the entire image shown in FIG. 3 but are arranged being distributed on the disks 123 to 125. In addition, a part of the data in tables is copied into a cache control region on the memory 122 as required. A division unit of data in the lower layer logical tables 141 to 143 handled at the time of copying or other time is called a management table block (management table block on the logical table).

Here, the table (data) from the extent #0 to #N−1 (N is a positive integer) will be collectively referred to as a management table block #0 and the table (data) from the extent #N to #2N−1 will be collectively referred to as a management table block #1.

An effective flag for a certain logical extent indicates whether the logical extent is assigned to a physical extent (when assigned, the flag is on) (including information indicating that no assignment is made).

An assigned physical address for a certain logical extent indicates, when the logical extent is assigned to a physical extent, an address of the physical extent in question.

FIG. 4 shows a detailed structure of the higher layer physical table 132.

The higher layer physical table 132 exists on the memory 122 and manages a link pointer, a memory effective flag and an assigned memory address with respect to each management table block (a management table block on a physical table identified by a disk number (disks #0, #1, . . . in the figure) and a management table block number (the management table blocks #0, #1, . . . in the figure)) in each disk. The table 132 also has a free management table block counter and a free management table block lead link pointer for the management of a free management table block link.

A link pointer forms a free management table block link together with the free management table block lead link pointer. The free management table block link is a link formed only with a management table block in which among self (the management table block on the physical table)-contained physical extents, at least one physical extent is yet to be assigned to a logical extent exists.

The free management table block counter manages the number of management table blocks forming a free management table block link.

A memory effective flag for a certain management table block indicates whether the management table block exists on the memory 122 (when existing, the flag is on) (including information indicating that no assignment is made).

An assigned memory address for a certain management table block indicates, when the management table block exists on the memory 122 (when the memory effective flag is on), an address of the management table block on the memory 122.

FIG. 5 is a diagram showing a detailed structure of the lower layer physical tables 144 to 146.

The lower layer physical tables 144 to 146 manage a link pointer with respect to each physical extent (physical extent identified by a disk number (the disks #0, #1, . . . in the figure) and an extent number (the extents #0, #1, . . . in the figure)) in each disk. The tables also have a free extent counter and a free extent lead link pointer for the management of a free extent link.

Similarly to the lower layer logical tables 141 to 143, the tables do not exist as the entire image shown in FIG. 5 but are arranged being distributed on the disks 123 to 125. In addition, a part of the data of the tables is copied into a cache control region on the memory 122. A data division unit in the lower layer physical tables 144 to 146 that is handled at the time of copying or other time is called a management table block (management table block on the physical table).

Here, the table (data) from the extent #0 to #M−1 (M is a positive integer) will be collectively referred to as the management table block #0 and the table (data) from the extent #M to #2M−1 will be collectively referred to as the management table block #1.

A link pointer forms a free extent link together with the free extent lead link pointer. The free extent link is a link formed only with a physical extent to which a logical extent is yet to be assigned.

The free extent counter manages the number of physical extents forming a free extent link.

Figure 6:
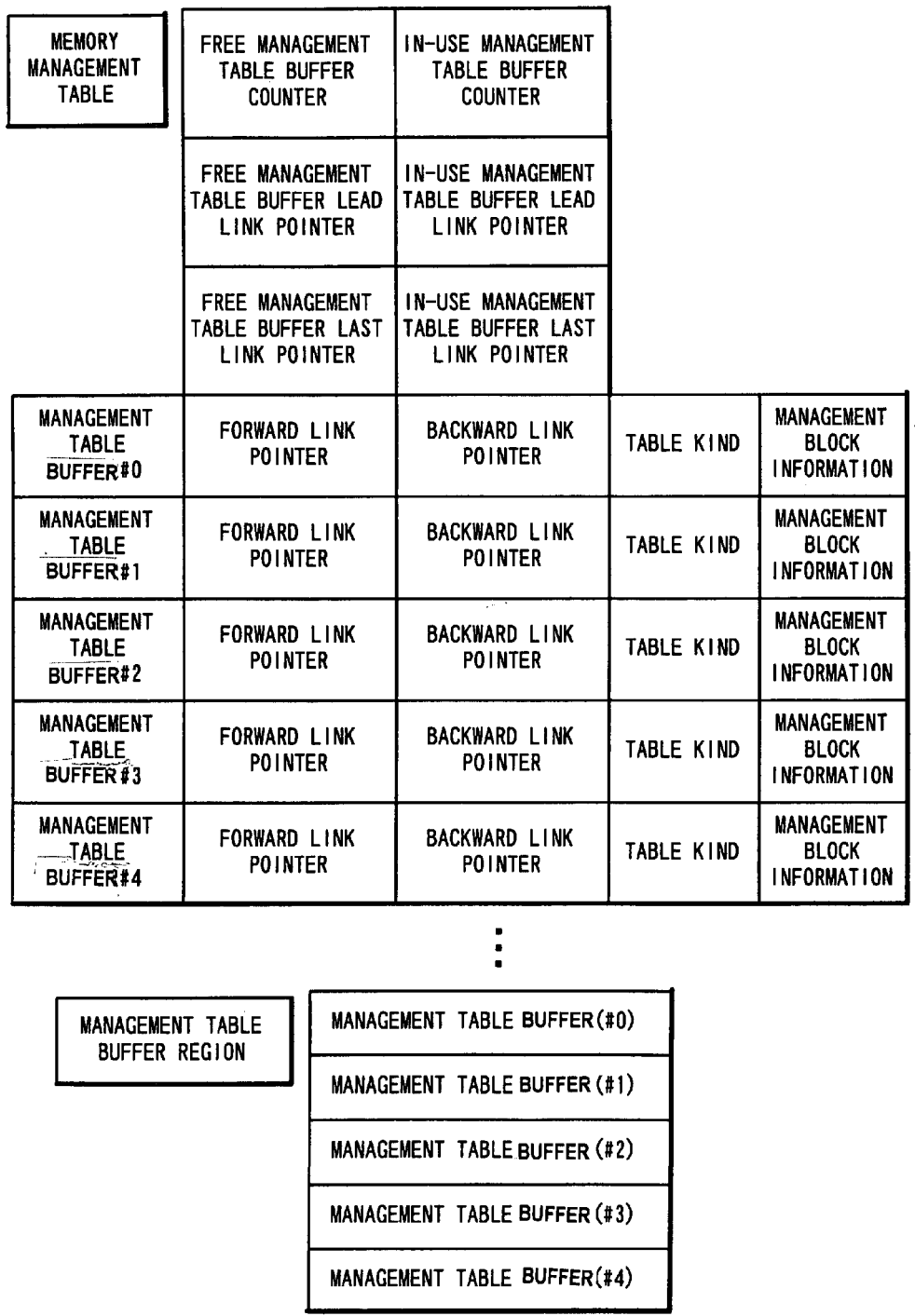
FIG. 6 is a diagram showing a detailed structure of a memory management table and a management table buffer region in FIG. 1.

FIG. 6 is a diagram showing a detailed structure of a cache control region (the memory management table 133 and the management table buffer region 134) on the memory 122.

The management table buffer region 134 is a region for storing a management table block (a management table block on a logical table or a management table block on a physical table) and has a plurality of management table buffers (a management table buffer (#0), a management table buffer (#1), . . . in the figure).

The memory management table 133 manages a forward link pointer, a backward link pointer, a table kind and management block information with respect to each management table buffer (management table buffer identified by a management table buffer number (the management table buffers #0, #1, . . . in the figure)). The table also has a free management table buffer counter, a free management table buffer lead link pointer and a free management table buffer last link pointer for the management of a free management table buffer link and has an in-use management table buffer counter, an in-use management table buffer lead link pointer and an in-use management table buffer last link pointer for the management of an in-use management table buffer link.

A forward link pointer and a backward link pointer form a free management table buffer link together with the free management table buffer lead link pointer and the free management table buffer last link pointer or form an in-use management table buffer link together with the in-use management table buffer lead link pointer and the in-use management table buffer last link pointer.

The free management table buffer counter manages the number of management table buffers included in a free management table buffer link. The in-use management table buffer counter manages the number of management table buffers included in an in-use management table buffer link.

A table kind for a certain management table buffer indicates whether, in the management table buffer in question, a management table block on the logical table is stored or a management table block on the physical table is stored.

Management block information for a certain management table buffer indicates a management table block number of a management table block stored in the management table buffer in question.

Figure 7:
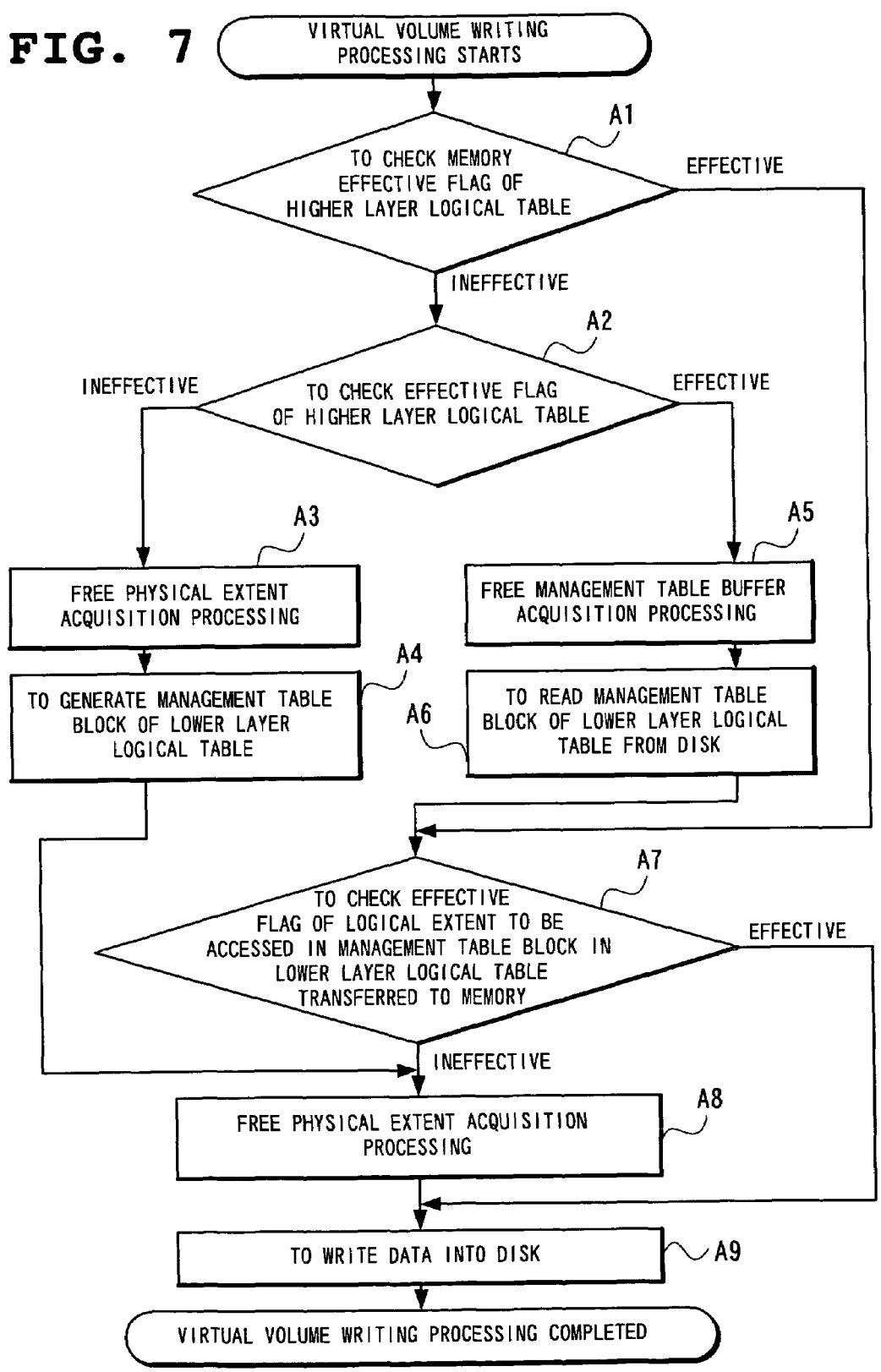
FIG. 7 is a flow chart showing virtual volume writing processing in the virtual volume management system shown in FIG. 1.

FIG. 7 is a flow chart showing virtual volume writing processing in the virtual volume management system according to the present mode of implementation. The processing is composed of a higher layer logical table memory effective flag check step A1, a higher layer logical table effective flag check step A2, a free physical extent acquisition processing step A3, a management table block generation step A4, a free management table buffer acquisition processing step A5, a management table block reading step A6, a logical extent effective flag check step A7, a free physical extent acquisition processing step A8 and a data writing step A9.

Figure 8:
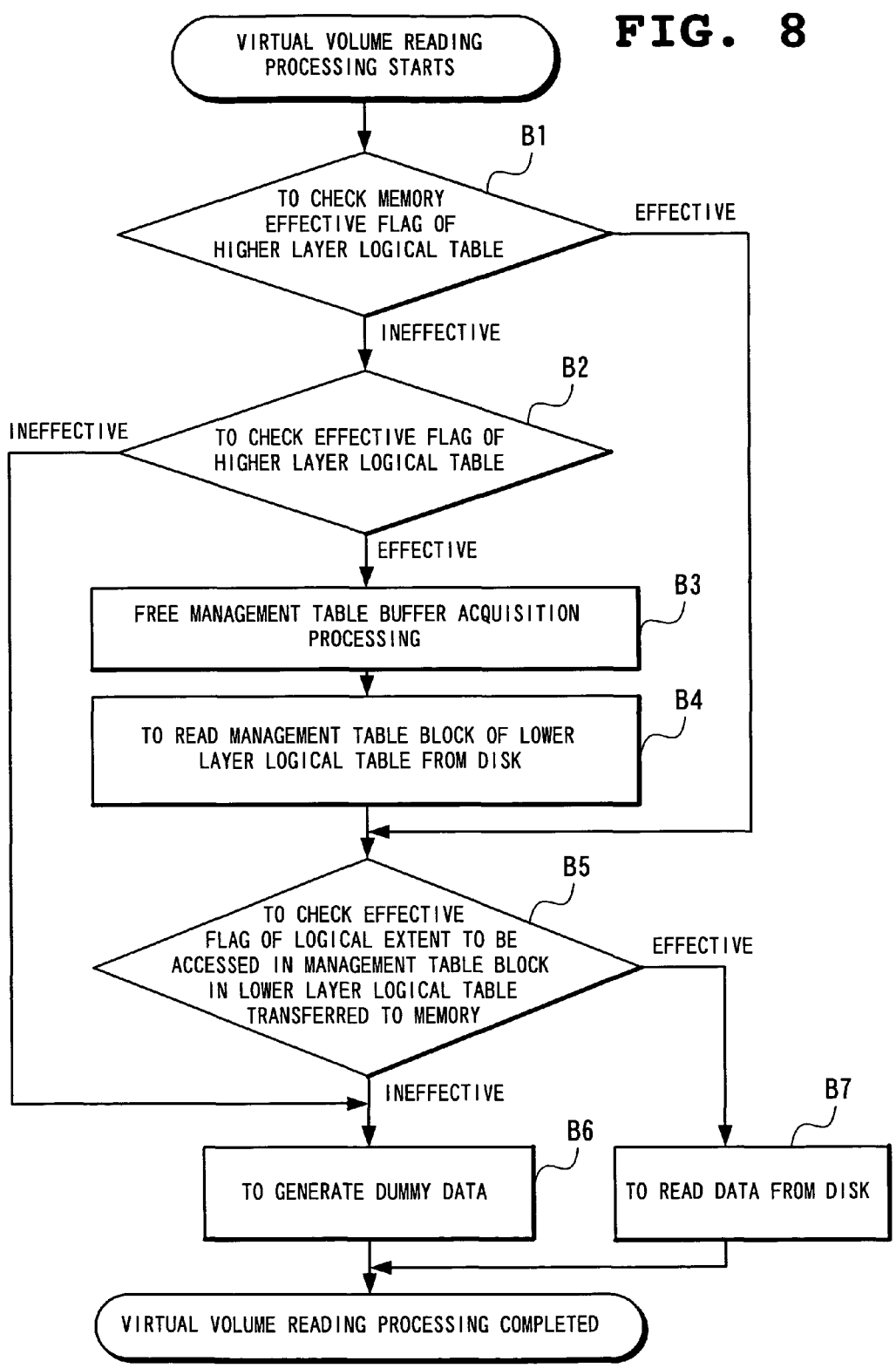
FIG. 8 is a flow chart showing virtual volume reading processing in the virtual volume management system shown in FIG. 1.

FIG. 8 is a flow chart showing virtual volume reading processing in the virtual volume management system according to the present mode of implementation. The processing is composed of a higher layer logical table memory effective flag check step B1, a higher layer logical table effective flag check step B2, a free management table buffer acquisition processing step B3, a management table block reading step B4, a logical extent effective flag check step A5, a dummy data generation step B6 and a data reading step B7.

Figure 9:
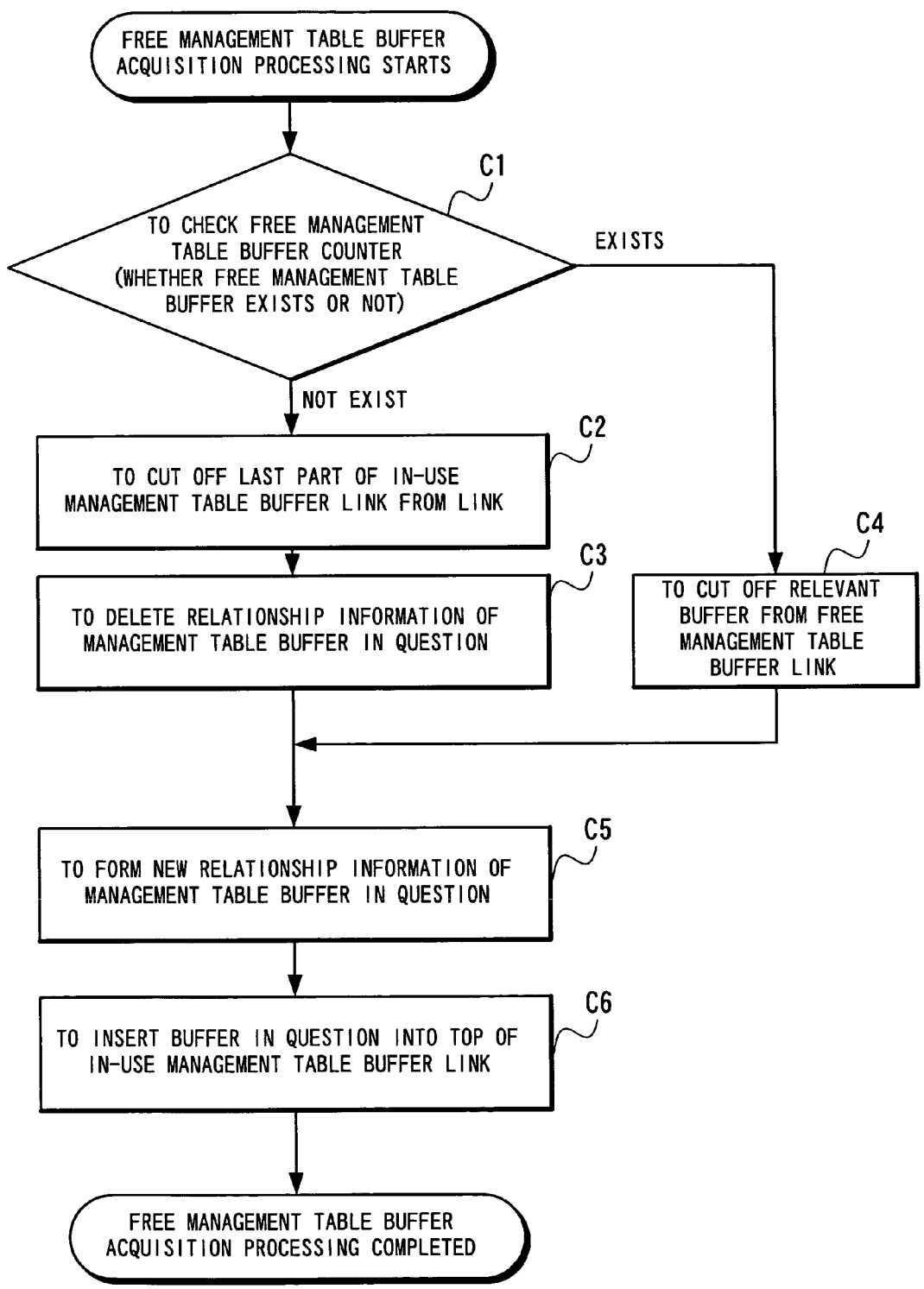
FIG. 9 is a flow chart showing free management table buffer acquisition processing in the virtual volume management system shown in FIG. 1.

FIG. 9 is a flow chart showing free management table buffer acquisition processing in the virtual volume management system according to the present mode of implementation. The processing is composed of a free management table buffer counter check step C1, an in-use management table buffer link removal step C2, a management table buffer relationship information deletion step C3, a free management table buffer link removal step C4, a management table buffer new relationship information setting up step C5 and an in-use management table buffer link insertion step C6.

Figure 10:
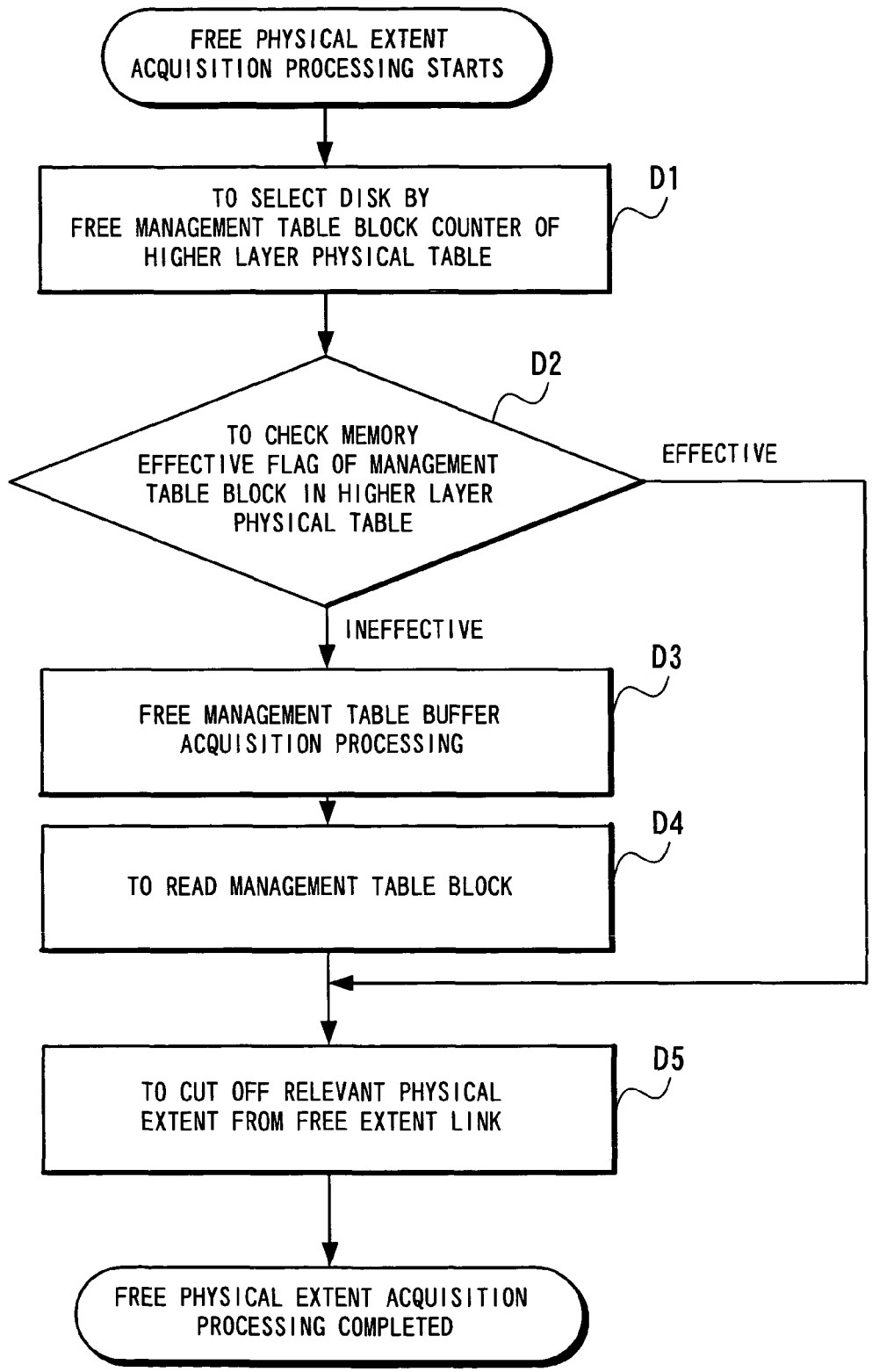
FIG. 10 is a flow chart showing free physical extent acquisition processing in the virtual volume management system shown in FIG. 1.

FIG. 10 is a flow chart showing free physical extent acquisition processing in the virtual volume management system according to the present mode of implementation. The processing is composed of a disk selection step D1, a higher layer physical table memory effective flag check step D2, a free management table buffer acquisition processing step D3, a management table block reading step D4 and a free extent link removal step D5.

Next, with reference to FIGS. 1 to 10, detailed description will be made of the entire operation of thus structured virtual volume management system according to the present mode of implementation.

First, operation conducted at the time of virtual volume setting up processing will be described.

The virtual volume setting up unit 1 in the controller 121 on the disk array device 12 sets up a virtual volume by forming such a higher layer logical table 131 as shown in FIG. 2.

At this time point, since the lower layer logical tables 141 to 143 are yet to be formed, all the effective flags in the higher layer logical table 131 indicate "ineffective".

By the foregoing processing (processing of forming the higher layer logical table 131 whose effective flags all indicate "ineffective"), setting up of the virtual volume is completed.

Since the processing conducted so far can be all realized by operation on the memory 122, the virtual volume setting up processing can be executed at high speeds.

Secondly, operation conducted at the time of volume (virtual volume) reading and writing processing will be described.

First, an operation flow conducted at the time of virtual volume writing processing will be described (see FIG. 7).

When the host 11 accesses the disk array device 12 by designating an address (logical address) of a logical extent to be written, the virtual volume writing processing starts. More specifically, the virtual volume read/write unit 2 in the controller 121 executes the following processing.

First, at the higher layer logical table 131, check a memory effective flag for a management table block including a logical extent at the address in question to determine whether the flag is on or not (whether the memory effective flag indicates effective or ineffective) (Step A1).

When the determination is made at Step A1 that "the memory effective flag indicates ineffective", which means that a necessary management table block fails to exist on the memory 122, next check an effective flag for the management table block in question at the higher layer logical table 131 to determine whether the flag is on or not (whether the effective flag indicates effective or ineffective) (Step A2).

When the determination is made at Step A2 that "the effective flag indicates effective", which means that a necessary management table block exists on the disks 123 to 125, conduct processing of acquiring a free management table buffer for transferring the management table block in question to the memory 122 (Step A5). The free management table buffer acquisition processing will be detailed later.

When obtaining a management table buffer in the management table buffer region 134 on the memory 122 in the free management table buffer acquisition processing at Step A5, execute processing of reading the management table block in question to the management table buffer in question from the lower layer logical tables 141 to 143 on the disks 123 to 125 (Step A6).

When the reading processing (processing of transferring the management table block in question to the management table buffer) at Step A6 is completed or when the determination is made that "the memory effective flag indicates effective" at the above-described Step A1 (when a necessary management table block exists in the management table buffer in the management table buffer region 134 on the memory 122), check an effective flag for a relevant logical extent (logical extent to be accessed) in the management table block in question (part of the data of the lower layer logical tables 141 to 143 transferred onto the memory 122) at the management table buffer in question in the management table buffer region 134 on the memory 122 to determine whether the effective flag indicates effective or ineffective (Step A7).

When the determination is made at Step A7 that "the effective flag indicates ineffective", which means that the logical extent to be written is yet to be assigned to a physical extent, conduct free physical extent acquisition processing (Step A8). The free physical extent acquisition processing will be detailed later.

When the determination is made at Step A2 that "the effective flag indicates ineffective" (when neither on the disks 123 to 125, exists a necessary management table block), conduct the free physical extent acquisition processing because setting-up of the management table block in question should be executed (Step A3).

When acquiring a free physical extent at Step A3, form the management table block on the logical table (the management table block in question in the lower layer logical tables 141 to 143) on the physical extent in question (to conduct processing of forming the management table block in the lower layer logical tables 141 to 143) (Step A4).

Furthermore, since in this case, a logical extent to be written is yet to be assigned to a physical extent, conduct free physical extent acquisition processing (Step A8).

When the free physical extent acquisition processing at Step A8 is completed or when the determination is made that "the effective flag (effective flag for a logical extent to be accessed) indicates effective" at the above-described Step A7, because the logical extent in question is assigned to a physical extent and it is known to which physical extent the logical extent to which data is to be written is assigned, write the data to be written into the physical extent in question on the disks 123 to 125 (Step A9). As a result, the virtual volume writing processing is completed.

Next, operation flow at the time of virtual volume reading processing will be described (see FIG. 8).

Since a flow of the virtual volume reading processing (the flow in FIG. 8) is approximately the same as the flow of the virtual volume writing processing (the flow in FIG. 7), description will be made only of the differences.

The difference between the two processings is that of how to handle the situation when a logical extent specified by an address designated by the host 11 is yet to be assigned to a physical extent (when a write request/read request for such an address is generated).

In a case of the virtual volume reading processing, because at such an address, significant data for the host 11 fails to exist in general, so that reading is useless. When data read is conducted in this scenario, therefore, it is only necessary to return dummy data. Accordingly, unlike the virtual volume writing processing, none of physical extent assignment processing is conducted at this time point (Steps A3, A4 and A8 in FIG. 7).

More specifically, in the flow shown in FIG. 8, the virtual volume read/write unit 2 conducts no processing corresponding to Steps A3, Step A4 and Step A8 in FIG. 7. On the other hand, as characteristic processing in the flow shown in FIG. 8, dummy data generation processing (Step B6) is executed and, when a logical extent specified by a designated address is yet to be assigned to a physical extent, returns the dummy data to the host 11.

Based on the difference in processing contents between the virtual volume writing processing and the virtual volume reading processing (whether it is the writing processing or the reading processing), "data writing to a disk" (see Step A9) in the flow shown in FIG. 7 is replaced by "data reading from a disk" (see Step B7) in the flow shown in FIG. 8.

Thirdly, operation conducted at the time of free management table buffer acquisition processing will be described (see FIG. 9).

The free management table buffer acquisition unit 3 in the controller 121 conducts the following processing as the free management table buffer acquisition processing, at the above-described Step A5 or Step B3 or Step D3, which will be described later.

When the processing starts, the free management table buffer counter in the memory management table 133 is checked to determine existence/non-existence of a free management table buffer, based on the determination whether the counter value is zero or not (Step C1).

When the determination is made that "no free management table buffer exists (the value of the free management table buffer counter is zero)" at Step C1, which means that all the management table buffers are occupied with other management table blocks, purging processing should be conducted. Therefore, cut off a management table buffer existing at the end of an in-use management table buffer link is cut off as an LRU (least recently used) link from the in-use management table buffer link in question (Step C2).

Next, relationship information of the management table buffer in question (Step C3) is deleted. More specifically, a memory effective flag in a higher layer table (the higher layer logical table 131 or the higher layer physical table 132) corresponding to a management table block stored in the management table buffer in question is set to indicate ineffective.

On the other hand, when the determination is made at Step C1 that "a free management table buffer exists (the value of the free management table buffer counter is not zero)", since no purging processing is required, the free management table buffer from the free management table buffer link is cut off (Step C4).

Next, new relationship information of the management table buffer obtained at Step C3 or Step C4 is set up (Step C5). More specifically, information corresponding to a management table block stored in the management table buffer in question is set in a manner as described in the following "a" and "b".

a. In a higher layer table (the higher layer logical table 131 or the higher layer physical table 132), a memory effective flag corresponding to the management table block in question is made to indicate "effective" and an assigned memory address corresponding to the management table block in question is set.

b. In the memory management table 133, a table kind and management block information corresponding to the management table block in question is set.

Further to the above processing, the management table buffer in question is inserted into the top of the in-use management table buffer link as an LRU link (Step C6). As a result, the free management table buffer acquisition processing is completed.

Fourthly, operation conducted at the time of free physical extent acquisition processing will be described (see FIG. 10).

The free physical extent acquisition unit 4 in the controller 121 conducts the following processing as the free physical extent acquisition processing at Step A3 or Step A8.

When the processing starts, the free management table block counter in the higher layer physical table 132 is checked (when a plurality of disks exists, a plurality of free management table block counters is checked because the free management table block counters also exist in the plural). Then, based on the checking, a disk is selected such that the amount of assignment is evenly distributed to each of all the disks 123 to 125 (Step D1). Ordinarily a disk whose amount of assignment is the least (whose free management table block counter value is the largest) is selected.

Next, a management table block linked to the top of a free management table block link related to the disk in question (the disk selected at Step D1) in the higher layer physical table 132 is checked to determine whether a memory effective flag of the management table block in question indicates effective or ineffective (Step D2).

When the determination is made at Step D2 that "the memory effective flag of the management table block in question indicates ineffective", which means that the management table block in question fails to exist on the memory 122, the reading processing will be required. In this case, accordingly, the free management table buffer acquisition processing (Step D3) is conducted to read (transfer) the management table block in question into the management table buffer obtained at Step D3 (Step D4).

On the other hand, when the determination is made at Step D2 that "the memory effective flag of the management table block in question indicates effective" or when reading of the management table block at Step D4 is completed, a physical extent linked to the top of a free extent link related to the management table block in question is cut off from the free extent link to obtain a free physical extent in the lower layer physical tables 144 to 146 (Step D5). As a result, the free physical extent acquisition processing is completed.

(2) Second Mode of Implementation

Figure 11:
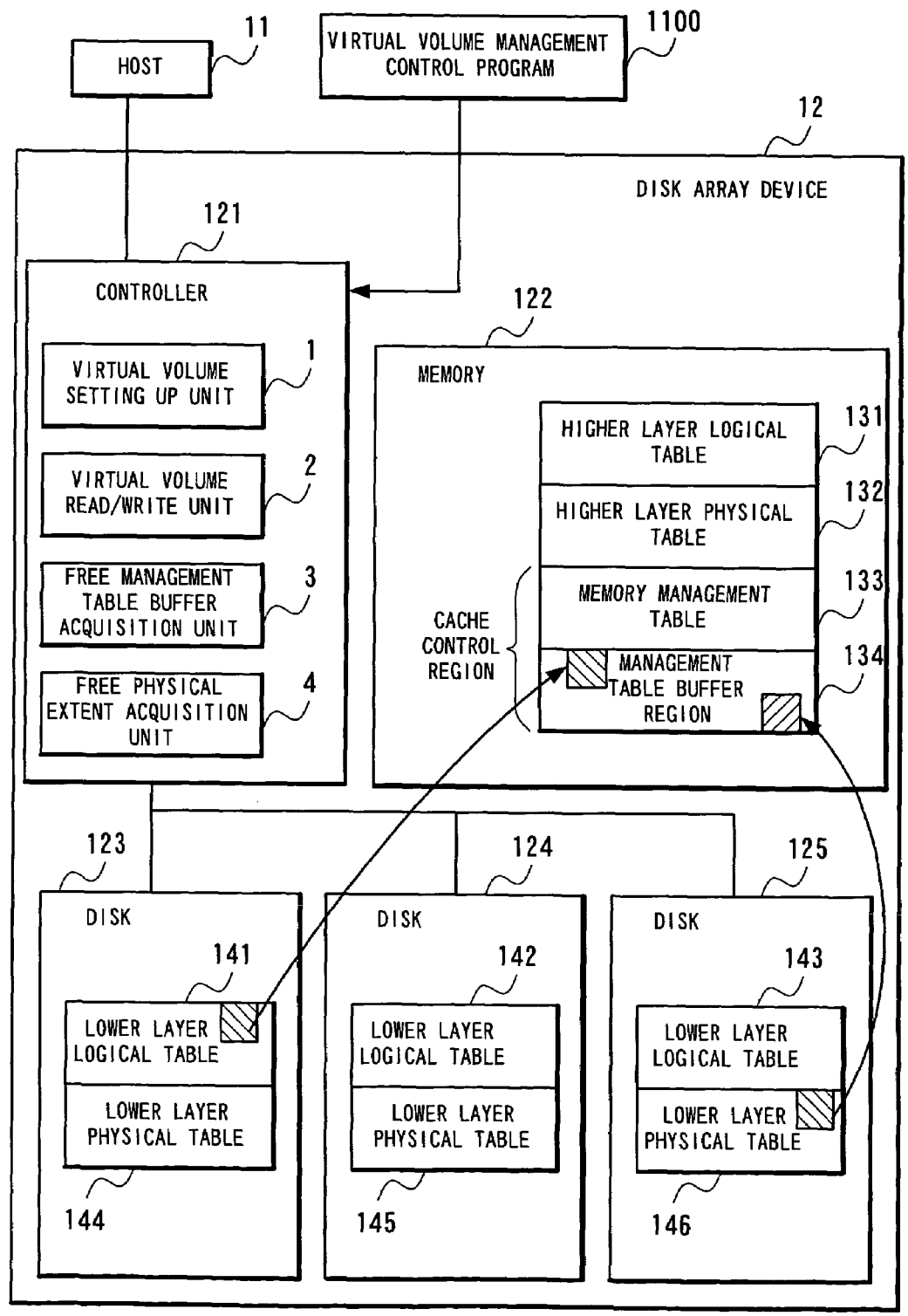
FIG. 11 is a block diagram showing a structure of a second mode of implementation according to the present invention.
Figure 12:
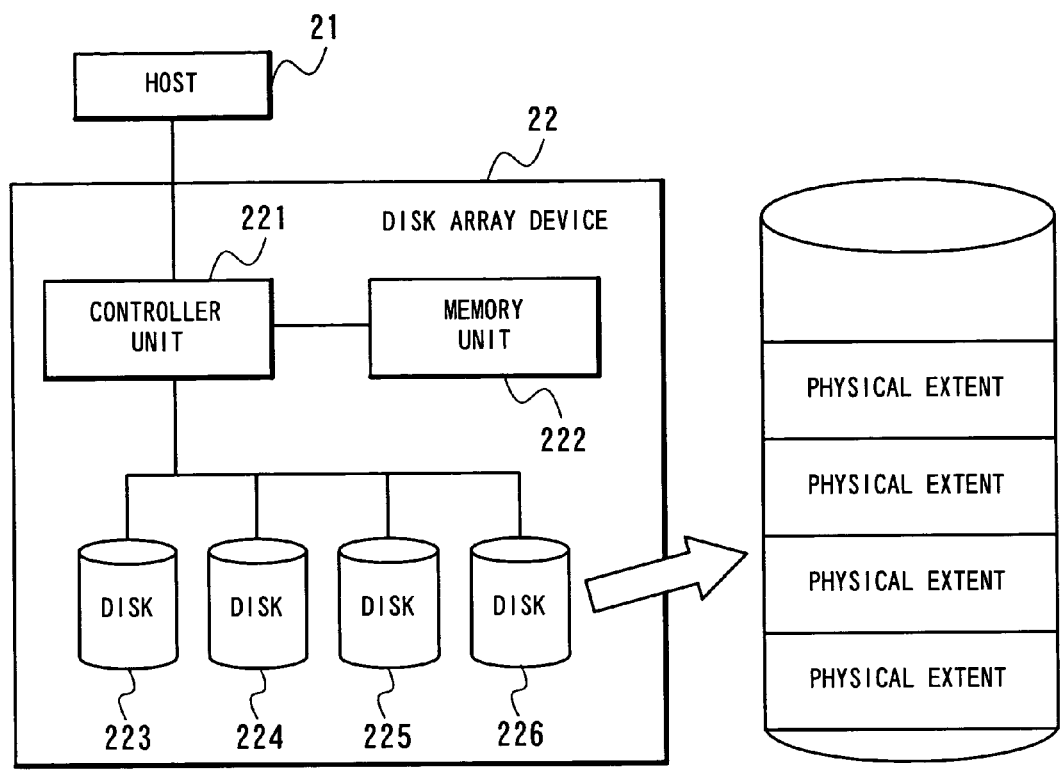
FIG. 12 is a block diagram for use in explaining a conventional virtual volume management system.
Figure 13:
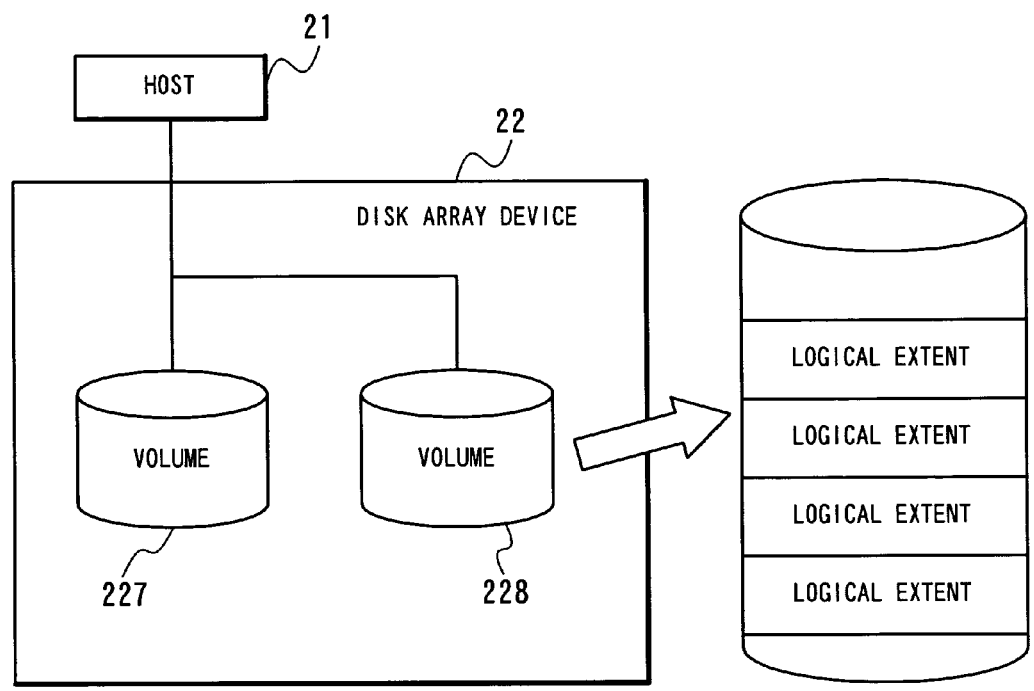
FIG. 13 is a block diagram for use in explaining the conventional virtual volume management system.

FIG. 11 is a block diagram showing a structure of a second mode of implementation of the present invention.

With reference to FIG. 11, the second mode of implementation of the present invention differs from the virtual volume management system according to the first mode of implementation shown in FIG. 1 in including a virtual volume management control program 1100.

The virtual volume management control program 1100 is read into the controller 121 in the disk array device 12 to control operation of the controller 121 in question as the virtual volume setting up unit 1, the virtual volume read/write unit 2, the free management table buffer acquisition unit 3 and the free physical extent acquisition unit 4. Since the operation of the controller 121 under the control of the virtual volume management control program 1100 is completely the same as the operation of the controller 121 (the virtual volume setting up unit 1, the virtual volume read/write unit 2, the free management table buffer acquisition unit 3 and the free physical extent acquisition unit 4) in the first mode of implementation on the premise that the memory 122 having the higher layer logical table 131, the higher layer physical table 132, the memory management table 133 and the management table buffer region 134, and the disks 123 to 125 for storing the lower layer logical tables 141 to 143 and the lower layer physical tables 144 to 146 are provided, no detailed description will be made of the operation.

As described in the foregoing, the present invention produces the following effects.

A primary effect is that of enabling virtual volume space of a large capacity to be realized without provision of an expensive memory having a large capacity, by arranging management tables (a lower layer logical table and a lower layer physical table) indispensable for the management of a virtual volume on a disk and managing only a part of them on a memory.

Here, when management information is arranged on a disk, an overhead will be generated in the reference to the management information in general. In the present invention, however, with the management information sectioned into blocks (division unit) called management table blocks, cache management is conducted using a limited memory region (cache control region), whereby a part frequently referred to among all the management information will exist on the memory.

In other words, a second effect is that none of such an overhead problem as described above is caused. As a result, the above-described first effect that "realizing a virtual volume of a large capacity without using a memory of a large capacity" can be attained without any special problems to be mentioned.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A disk array device to be accessed by a host, comprising:
a logical table having a layered structure formed of a higher layer logical table arranged on a memory and a lower layer logical table arranged on a disk for storing a correspondence relationship between each part of a virtual volume and each part of a physical region,
a physical table having a layered structure formed of a higher layer physical table arranged on the memory and a lower layer physical table arranged on the disk for storing a state of assignment of each part of a physical region, and
a controller for reading a part or all of said lower layer logical table and said lower layer physical table into said memory as required to conduct management of said virtual volume.

2. A disk array device to be accessed by a host, comprising:
a cache control region on a memory which is formed of a plurality of management table buffers and a memory management table for conducting management of the buffers,
a logical table having a layered structure formed of a higher layer logical table arranged on the memory and a lower layer logical table arranged on a disk for storing information indicating where a physical extent on the disk to which each logical extent in a virtual volume is assigned exists,
a physical table having a layered structure formed of a higher layer physical table arranged on the memory and a lower layer physical table arranged on the disk for storing information indicative of a state of assignment of each physical extent, and
a controller for, when access to said lower layer logical table and said lower layer physical table is required, obtaining said management table buffer to copy data in said lower layer logical table and said lower layer physical table to be accessed into the management table buffer in question and store the data in the management table buffer after accessing, thereby conducting cache control between said cache control region and said lower layer logical table and said lower layer physical table on the disk.

3. The disk array device as set forth in claim 2, wherein
said cache control region is formed of a management table buffer region having a plurality of management table buffers and a memory management table for managing the management table buffer region,
the higher layer logical table of said logical table manages position, on said cache control region and on the disk, of each management table block in the lower layer logical table,
said higher layer physical table of said physical table manages position, on said cache control region and on the disk, of each management table block in the lower layer physical table, and
said controller copies data of said management table block in said lower layer logical table and said lower layer physical table to be accessed into the management table buffer in question to conduct cache control between said cache control region and a region on the disk in which the management table block is stored.

4. The disk array device as set forth in claim 2, wherein
in a case where access to said lower layer logical table and said lower layer physical table is required, when no free management table buffer for copying data of a necessary part exists, said controller conducts processing of purging a management table buffer whose access time is the earliest.

5. The disk array device as set forth in claim 4, wherein
said higher layer logical table manages an effective flag, an assigned physical address, a memory effective flag and an assigned memory address for each management table block in each volume,
said lower layer logical table manages an effective flag and an assigned physical address for each logical extent in each volume, said higher layer physical table manages a link pointer, a memory effective flag and an assigned memory address for each management table block in each disk and has a free management table block counter and a free management table block lead link pointer for the management of a free management table block link, said lower layer physical table manages a link pointer for each physical extent in each disk and has a free extent counter and a free extent lead link pointer for the management of a free extent link, and said memory management table of said cache control region manages a forward link pointer, a backward link pointer, a table kind and management block information for each management table buffer, and for the management of a free management table buffer link, has a free management table buffer counter, a free management table buffer lead link pointer and a free management table buffer last link pointer and for the management of an in-use management table buffer link, has an in-use management table buffet counter, an in-use management table buffer lead link pointer and an in-use management table buffer last link pointer.

6. The disk array device as set forth in claim 5, comprising a controller including:

a virtual volume setting up element for setting up a virtual volume by setting up a higher layer logical table having information indicating that a lower layer logical table is yet to be set up, a virtual volume read/write element for conducting virtual volume writing processing according to an access related to a write request from the host and conducting virtual volume reading processing according to an access related to a read request from the host, a free physical extent acquisition element for conducting free physical extent acquisition processing according to a request from said virtual volume read/write element, and a free management table buffer acquisition element for conducting free management table buffer acquisition processing according to a request from said virtual volume read/write element and said free physical extent acquisition element, thereby realizing cache control for the management of a virtual volume by each said element.

7. The disk array device as set forth in claim 2, wherein said cache control region is formed of a management table buffer region having a plurality of management table buffers and a memory management table for managing the management table buffer region, the higher layer logical table of said logical table manages position, on said cache control region and on the disk, of each management table block in the lower layer logical table, said higher layer physical table of said physical table manages position, on said cache control region and on the disk, of each management table block in the lower layer physical table, and said controller copies data of said management table block in said lower layer logical table and said lower layer physical table to be accessed into the management table buffer in question to conduct cache control between said cache control region and a region on the disk in which the management table block is stored, and in a case where access to said lower layer logical table and said lower layer physical table is required, when no free management table buffer for copying data of a necessary part exists, conducts processing of purging a management table buffer whose access time is the earliest.

8. A virtual volume management method in a disk array device to be accessed by a host, comprising:

with a logical table having a layered structure formed of a higher layer logical table arranged on a memory and a lower layer logical table arranged on a disk for storing a correspondence relationship between each part of a virtual volume and each part of a physical region provided, and with a physical table having a layered structure formed of a higher layer physical table arranged on the memory and a lower layer physical table arranged on the disk for storing a state of assignment of each part of a physical region provided, conducting management of said virtual volume by reading a part or all of said lower layer logical table and said lower layer physical table into said memory as required.

9. A virtual volume management method in a disk array device to be accessed by a host, comprising:

with a cache control region on a memory which is formed of a plurality of management table buffers and a memory management table for conducting management of the buffers provided, with a logical table having a layered structure formed of a higher layer logical table arranged on the memory and a lower layer logical table arranged on a disk for storing information indicating where a physical extent on the disk to which each logical extent in a virtual volume is assigned exists provided, and with a physical table having a layered structure formed of a higher layer physical table arranged on the memory and a lower layer physical table arranged on the disk for storing information indicative of a state of assignment of each physical extent provided, when access to said lower layer logical table and said lower layer physical table is required, obtaining said management table buffer to copy data in said lower layer logical table and said lower layer physical table to be accessed into the management table buffer in question and store the data in the management table buffer after accessing, thereby conducting cache control between said cache control region and said lower layer logical table and said lower layer physical table on the disk.

10. The virtual volume management method in a disk array device as set forth in claim 9, wherein said cache control region is formed of a management table buffer region having a plurality of management table buffers and a memory management table for managing the management table buffer region, the higher layer logical table of said logical table manages position, on said cache control region and on the disk, of each management table block in the lower layer logical table, said higher layer physical table of said physical table manages position, on said cache control region and on the disk, of each management table block in the lower layer physical table, and data of said management table block in said lower layer logical table and said lower layer physical table to be accessed is copied into the management table buffer in question to conduct cache control between said cache control region and a region on the disk in which the management table block is stored.

11. The virtual volume management method in a disk array device as set forth in claim 9, wherein in a case where access to said lower layer logical table and said lower layer physical table is required, when no free management table buffer for copying data of a necessary part exists, processing of purging a management table buffer whose access time is the earliest is conducted.

12. The virtual volume management method in a disk array device as set forth in claim 11, wherein
said higher layer logical table manages an effective flag, an assigned physical address, a memory effective flag and an assigned memory address for each management table block in each volume,
said lower layer logical table manages an effective flag and an assigned physical address for each logical extent in each volume,
said higher layer physical table manages a link pointer, a memory effective flag and an assigned memory address for each management table block in each disk and has a free management table block counter and a free management table block lead link pointer for the management of a free management buffer table block link,
said lower layer physical table manages a link pointer for each physical extent in each disk and has a free extent counter and a free extent lead link pointer for the management of a free extent link, and
said memory management table of said cache control region manages a forward link pointer, a backward link pointer, a table kind and management block information for each management table buffer, and for the management of a free management table buffer link, has a free management table buffer counter, a free management table buffer lead link pointer and a free management table buffer last link pointer and for the management of an in-use management table buffer link, has an in-use management table buffer counter, an in-use management table buffer lead link pointer and an in-use management table buffer last link pointer.

13. The virtual volume management method in a disk array device as set forth in claim 12, comprising:
a virtual volume setting up step of setting up a virtual volume by setting up a higher layer logical table having information indicating that a lower layer logical table is yet to be set up,
a virtual volume read/write step of conducting virtual volume writing processing according to an access related to a write request from the host and conducting virtual volume reading processing according to an access related to a read request from the host,
a free physical extent acquisition step of conducting free physical extent acquisition processing according to a request from said virtual volume read/write step, and
a free management table buffer acquisition step of conducting free management table buffer acquisition processing according to a request from said virtual volume read/write step and said free physical extent acquisition step,
thereby realizing cache control for the management of a virtual volume by each said step.

14. The virtual volume management method in a disk array device as set forth in claim 9, wherein
said cache control region is formed of a management table buffer region having a plurality of management table buffers and a memory management table for managing the management table buffer region,
the higher layer logical table of said logical table manages position, on said cache control region and on the disk, of each management table block in the lower layer logical table,
said higher layer physical table of said physical table manages position, on said cache control region and on the disk, of each management table block in the lower layer physical table,
data of said management table block in said lower layer logical table and said lower layer physical table to be accessed is copied into the management table buffer in question to conduct cache control between said cache control region and a region on the disk in which the management table block is stored, and
in a case where access to said lower layer logical table and said lower layer physical table is required, when no free management table buffer for copying data of a necessary part exists, processing of purging a management table buffer whose access time is the earliest is conducted.

15. A machine-readable memory device encoded with a set of machine-readable instructions for conducting virtual volume management in a disk array device, said set of instructions comprising:
with a cache control region on a memory which is formed of a management table buffer region having a plurality of management table buffers and a memory management table for conducting management of the management table buffer region provided,
with a logical table which has a layered structure formed of a higher layer logical table arranged on the memory and a lower layer logical table arranged on a disk, the higher layer logical table managing position, on said cache control region and on the disk, of each management table block in the lower layer logical table, and stores information indicating where a physical extent on the disk to which each logical extent in a virtual volume is assigned exists provided, and
with a physical table which has a layered structure formed of a higher layer physical table arranged on the memory and a lower layer physical table arranged on the disk, the higher layer physical table managing position, on said cache control region and on the disk, of each management table block in the lower layer physical table, and stores information indicative of a state of assignment of each physical extent provided,
when access to the lower layer logical table/the lower layer physical table is required, obtaining said management table buffer to copy data of a management table block in the lower layer logical table/the lower layer physical table to be accessed into the management table buffer in question and store the data in the management table buffer after accessing, thereby conducting cache control between said cache control region and a region on the disk in which the management table block is stored.

16. The computer-readable memory device as set forth in claim 15, said set of instructions further comprising,
in a case where access to the lower layer logical table/lower layer physical table is required, when no free management table buffer for copying data of a necessary part exists, realizing copying of said data by processing of purging a management table buffer whose access time is the earliest.

17. The machine-readable memory device as set forth in claim 15, wherein
said memory stores the higher layer logical table for managing an effective flag, an assigned physical address, a memory effective flag and an assigned memory address for each management table block in each volume, the higher layer physical table for managing a link pointer, a memory effective flag and an assigned memory address for each management table block in each disk and having a free management table block counter and a free management table block lead link pointer for the management of a free management table block link, and said memory management table for managing a forward link pointer, a backward link pointer, a table kind and management block information for each management table buffer, and for the management of a free management table buffer link, having a free management table buffer counter, a free management table buffer lead link pointer and a free management table buffer last link pointer and for the management of an in-use management table buffer link, having an in-use management table buffer counter, an in-use management table buffer lead link pointer and an in-use management table buffer last link pointer, and said disk stores the lower layer logical table for managing an effective flag and an assigned physical address for each logical extent in each volume and the lower layer physical table for managing a link pointer for each physical extent in each disk and having a free extent counter and a free extent lead link pointer for the management of a free extent link, and which comprises the functions of:

setting up a virtual volume by setting up a higher layer logical table having information indicating that a lower layer logical table is yet to be set up, conducting virtual volume writing processing according to an access related to a write request from the host and conducting virtual volume reading processing according to an access related to a read request from the host, conducting free physical extent acquisition processing according to a request from said virtual volume read/write function, and executing free management table buffer acquisition processing according to a request from said virtual volume read/write function and said free physical extent acquisition function, thereby realizing cache control for the management of a virtual volume by these functions.

* * * * *